March 31, 1964  L. R. DAFOE  3,126,975
AUTOMOTIVE VEHICLE WITH TILTING HALF-CAB
Filed Dec. 14, 1959  6 Sheets-Sheet 1

INVENTOR
LESLIE R. DAFOE
BY
ATTORNEY

March 31, 1964

L. R. DAFOE 3,126,975

AUTOMOTIVE VEHICLE WITH TILTING HALF-CAB

Filed Dec. 14, 1959

INVENTOR
LESLIE R. DAFOE

BY

ATTORNEY

INVENTOR.
LESLIE R. DAFOE
ATTORNEYS

March 31, 1964   L. R. DAFOE   3,126,975
AUTOMOTIVE VEHICLE WITH TILTING HALF-CAB
Filed Dec. 14, 1959   6 Sheets-Sheet 4

INVENTOR.
LESLIE R. DAFOE
BY
ATTORNEYS

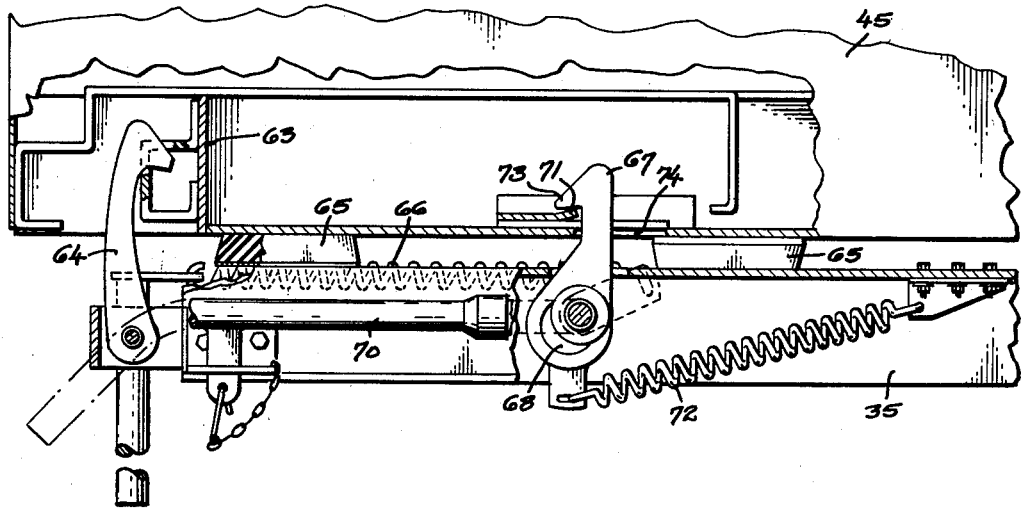
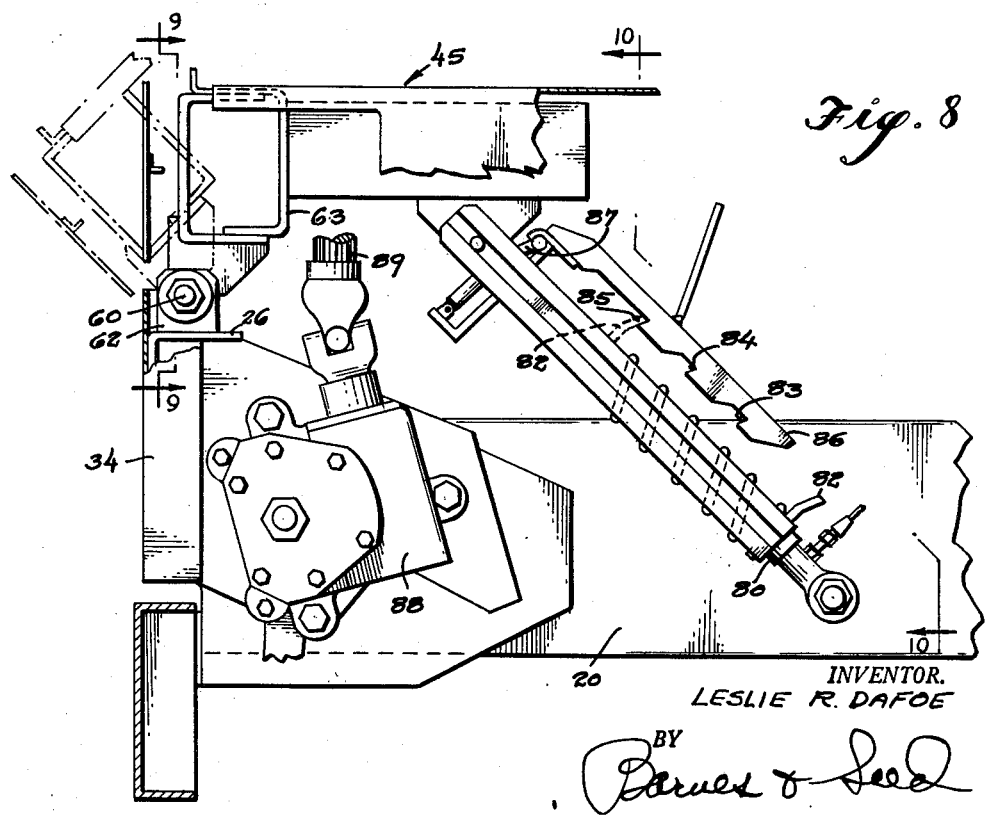

March 31, 1964   L. R. DAFOE   3,126,975
AUTOMOTIVE VEHICLE WITH TILTING HALF-CAB
Filed Dec. 14, 1959   6 Sheets-Sheet 6

INVENTOR.
LESLIE R. DAFOE
BY
ATTORNEYS

United States Patent Office 3,126,975
Patented Mar. 31, 1964

3,126,975
AUTOMOTIVE VEHICLE WITH TILTING
HALF-CAB
Leslie R. Dafoe, Seattle, Wash., assignor to Pacific Car
and Foundry Company, Seattle, Wash., a corporation
of Washington
Filed Dec. 14, 1959, Ser. No. 859,440
4 Claims. (Cl. 180—89)

This invention relates to automotive vehicles of the general type in which the engine of the vehicle is located below the cab and wherein, for access to the engine, the cab is so mounted as to admit of being tilted forwardly into an out-of-the-way position. The present invention has for its principal object the provision of a vehicle of this nature in which the tilt-mounted cab extends from one side edge of the vehicle through only a portion of the vehicle's width and may be thus said to constitute only a half-cab, and wherein the engine of the vehicle is covered in part by such half-cab and in part by a permanently fixed hood which occupies a position between such cab and the opposite side edge of the vehicle.

A further and particular object of the invention is to provide a tilting-cab vehicle of the described nature characterized in that a tilting of the half-cab exposes one side of the engine for repair or servicing, and access is given to the other side of the engine by a normally closed hingedly mounted door.

A further important object of the invention is to engineer into a vehicle of the described nature a particularly advantageous means of supporting the customary vertical stack which dissipates exhaust gases from the engine.

The above and still additional objects and advantages of the invention will appear and be understood in the course of the following description and claims, the invention consisting in the novel construction and in the adaptation and combination of parts hereinafter described and claimed.

In the accompanying drawings:

FIG. 7 is an enlarged-scale fragmentary transverse vertical sectional view, looking forwardly, with the section line being substantially on the median line of a cross-bar which underlies the rear end of the cab.

FIG. 8 is an enlarged-scale fragmentary longitudinal vertical sectional view detailing the trunnion mounting for the cab, and the associated hydraulic ram structure.

Figure 1:
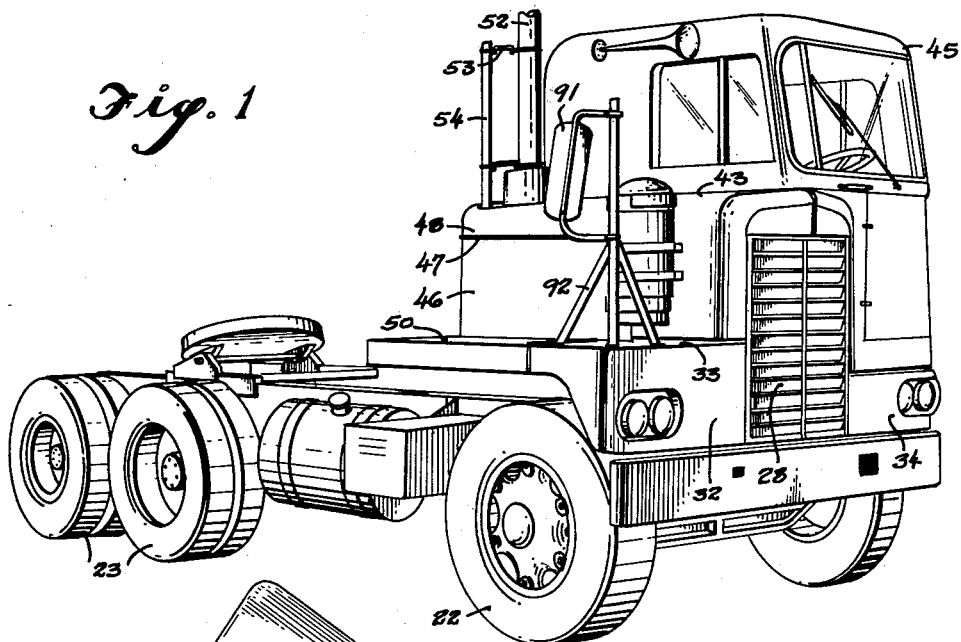
FIGURE 1 is a perspective view illustrating a tilting-cab vehicle embodying the preferred teachings of the present invention.

The automotive vehicle of the present invention has a chassis of the usual or a suitable construction, being here illustrated as providing a main frame comprising transversely spaced longitudinally extending channel principals designated by the numerals 20 and 21, with steerable road wheels 22 at the front and traction road wheels 23 at the rear, and having an engine 25 driving said rear wheels and supported between said frame principals adjacent the front end of the frame. Suitable transverse connections extend between said frame principals, and outriggers are provided at the extreme front of said main frame and at a point lying somewhat to the rear of the engine. Such front outriggers are denoted by 26 and 27 and are rigidly supported from the longitudinal frame principals to occupy positions one at one side and the other at the other side of a frame-carried radiator 28. Each front outrigger is covered by a facing member into which the headlights of the vehicle are recessed, and the facing member which lies at the starboard side of the vehicle presents both a front face 37, and a top face 33, hereinafter termed a fore-deck. The length of such deck, considered fore and aft of the vehicle, is comparatively short. The other or port-side facing member is more or less planar and is designated by 34.

Projecting ends of a cross-bar 35 form the rear outriggers. This bar is drawn from channel stock, located with the trough pointed downwardly, and derives support from gussets 36 secured to upwardly projecting ends of a hat-section yoke 37 constituting a principal cross-member for the frame. The upper surface of the cross-bar 35 lies on approximately the same level as the fore-deck 33.

Braces 40 run diagonally from the frame principals to the head end of the radiator at each side of the engine.

Figure 4:
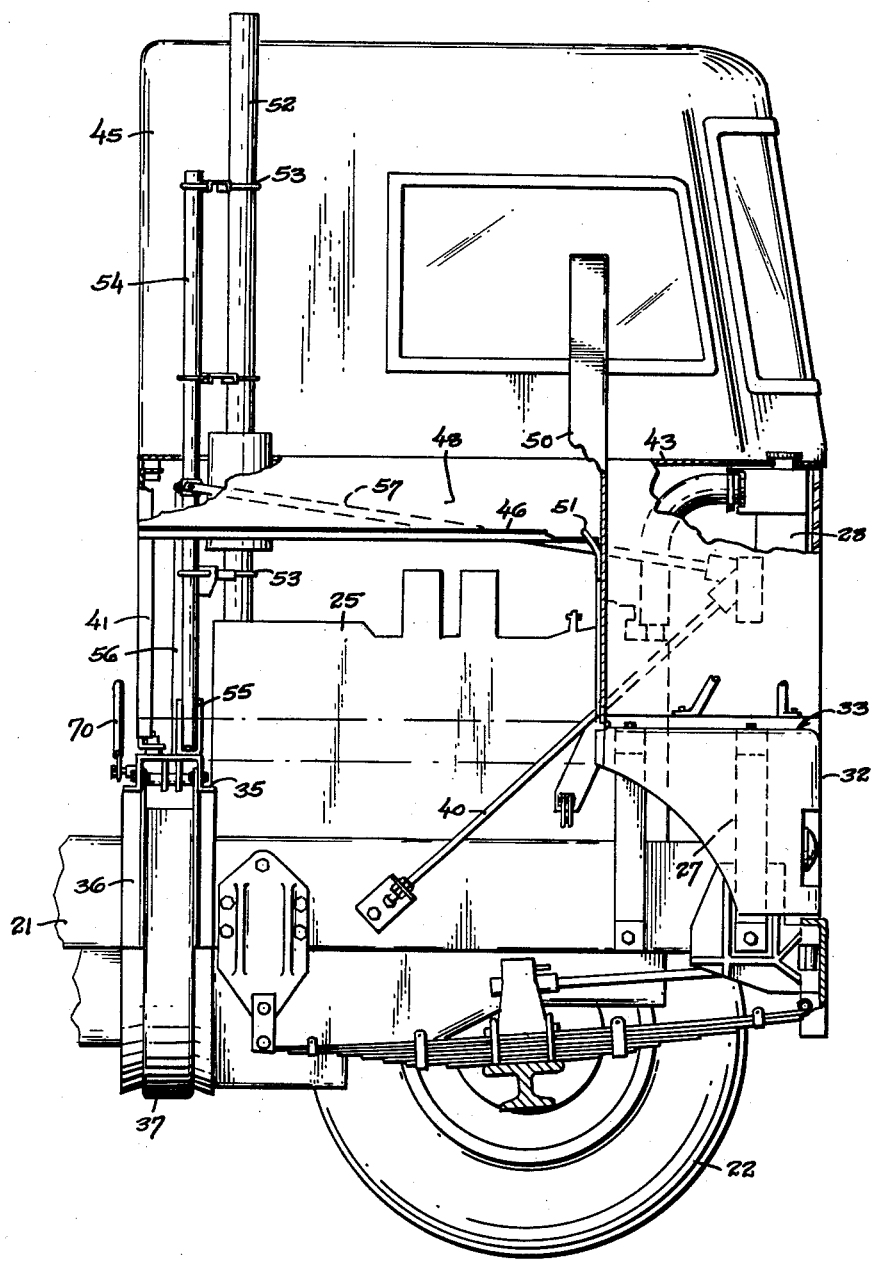
FIG. 4 is a fragmentary longitudinal vertical sectional view from a vantage point at the side of the vehicle opposite to that of FIG. 3, the section being taken on a line lying immediately to the inside of the starboard road wheel. The hinged door which provides access to the engine from the starboard side is here shown in its open position.
Figure 5:
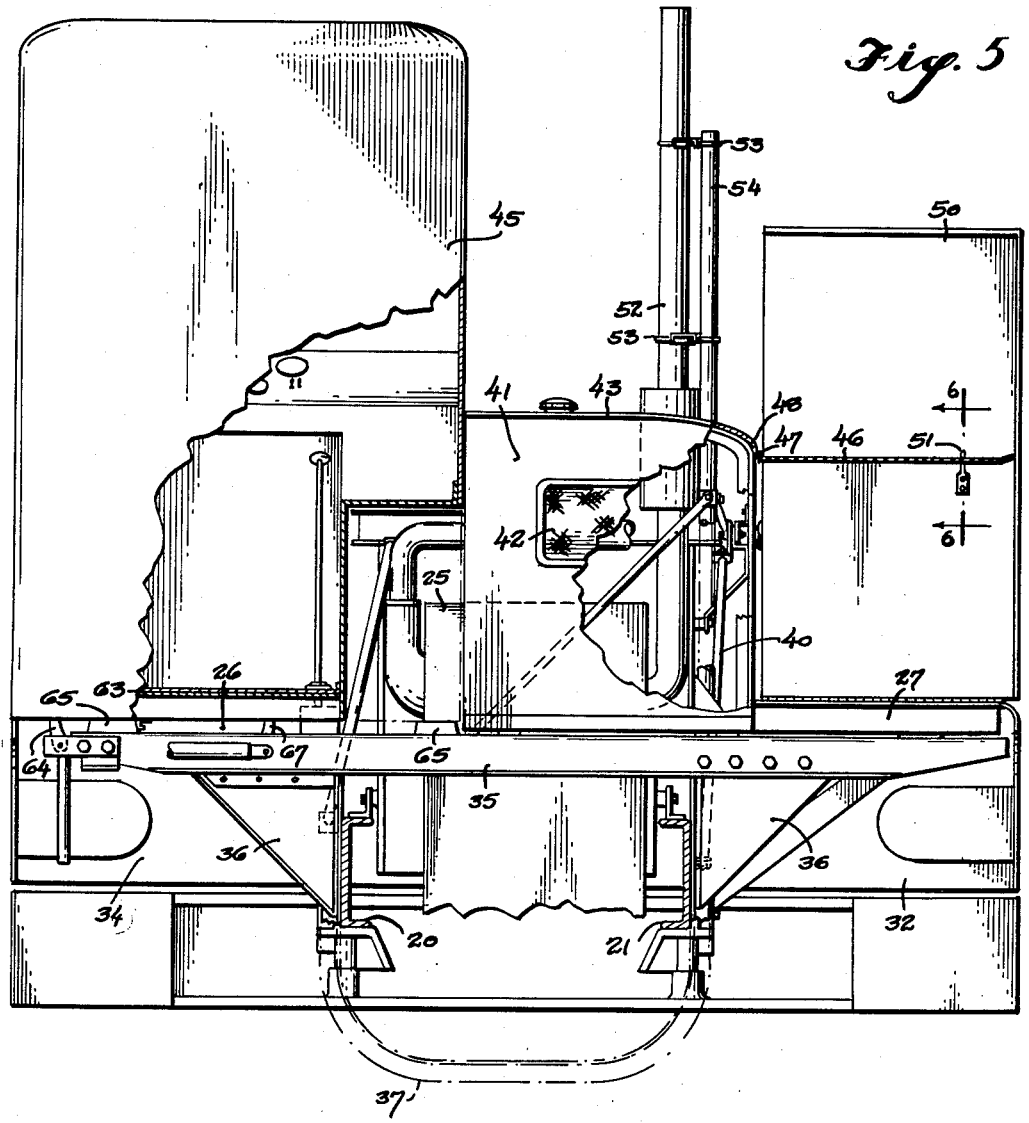
FIG. 5 is a transverse vertical sectional view, with parts broken away and in section, looking forwardly and with the section line lying immediately to the rear of the cab.
Figure 6:
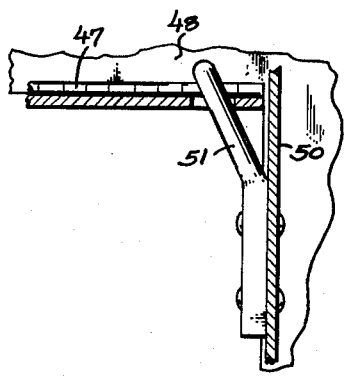
FIG. 6 is a fragmentary enlarged-scale longitudinal vertical sectional view on line 6—6 of FIG. 5.
Figure 9:
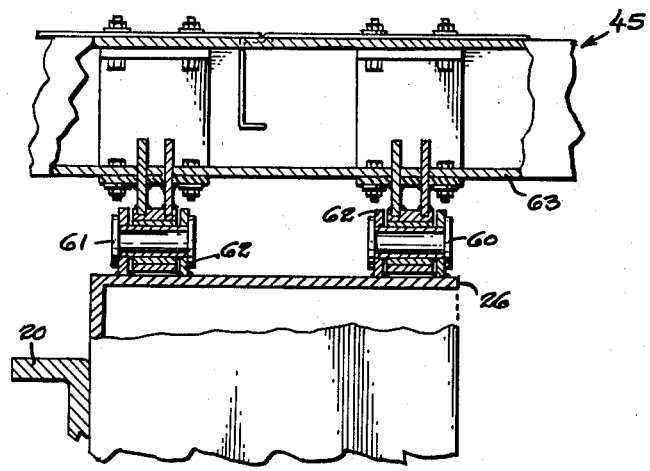
FIG. 9 is a fragmentary transverse vertical sectional view on line 9—9 of FIG. 8.
Figure 10:
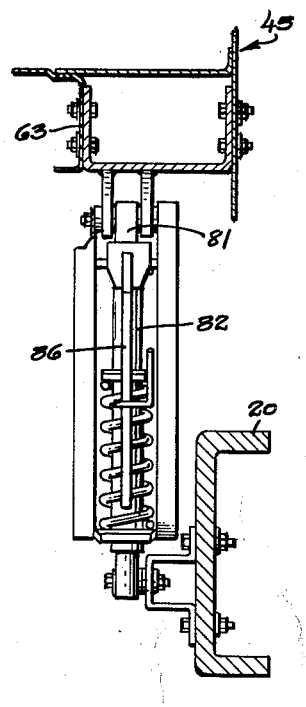
FIG. 10 is a fragmentary transverse vertical sectional view on line 10—10 of FIG. 8.

To the rear of the engine and footing upon the cross-bar 35 there is provided a transverse panel 41 having a screened opening 42 therein. This panel rises to a height approximating that of a shell for the radiator and forms a back wall for the engine compartment. A fixed hood 43 extends horizontally to said back wall from the shell, producing for the engine compartment an enclosure open along both sides for purposes of access. The port-side access opening is normally closed by a tilting cab 45, hereinafter described. The starboard-side access opening is normally closed by a door-forming panel 46 having its upper edge attached by a piano hinge 47 to a skirting flange 48 of the hood. The afore-mentioned fore-deck 33 is provided with a hinged prolongation 50 which extends to the cross-bar 35. This deck prolongation swings about a transverse horizontal axis from a normal horizontal position into and out of an upright position. The door-panel 46 is free to swing outwardly into its open position only when said deck prolongation has been lifted into the upright position in which it is shown in FIGS. 4, 5 and 6, and may then be secured in an open condition by engaging the door with a finger-hold 51.

A feature of the present invention is its provision of a permanently fixed exhaust stack 52 for the engine. This stack extends upwardly through an opening formed in the fixed hood 43, and is secured by shackles 53 to a steadying mast 54. The mast has its base attached by a suitable bracket 55 to the cross-bar 35, and is stiffened by two braces 56 and 57, one being a transverse member extending diagonally downwardly with its root end attached to the cross-bar and the other being a longitudinal member extending forwardly in a more or less horizontal plane with its root end attached to a fitting which is secured to the head end of the radiator.

The cab 45 is a half-cab in the sense that it accommodates only a single occupant, the driver of the vehicle. Co-axial trunnion shafts 60 and 61 provide the fulcrum about which the half-cab tilts, these trunnion shafts being carried by a respective one of two fittings 62 secured in transversely spaced relation along the upper edge of the front outrigger 26.

Half-cabs, in and of themselves, are not unusual and the present half-cab may be of ordinary construction. Suffice it to say that the same is completely closed and is substantially rectangular when viewed from either the front or the back other than for a re-entrant bottom jog (see FIGS. 1 and 5) at the inside which accommodates the intake manifold of the engine. The half-cab is or may be provided with a base frame 63.

Figure 2:
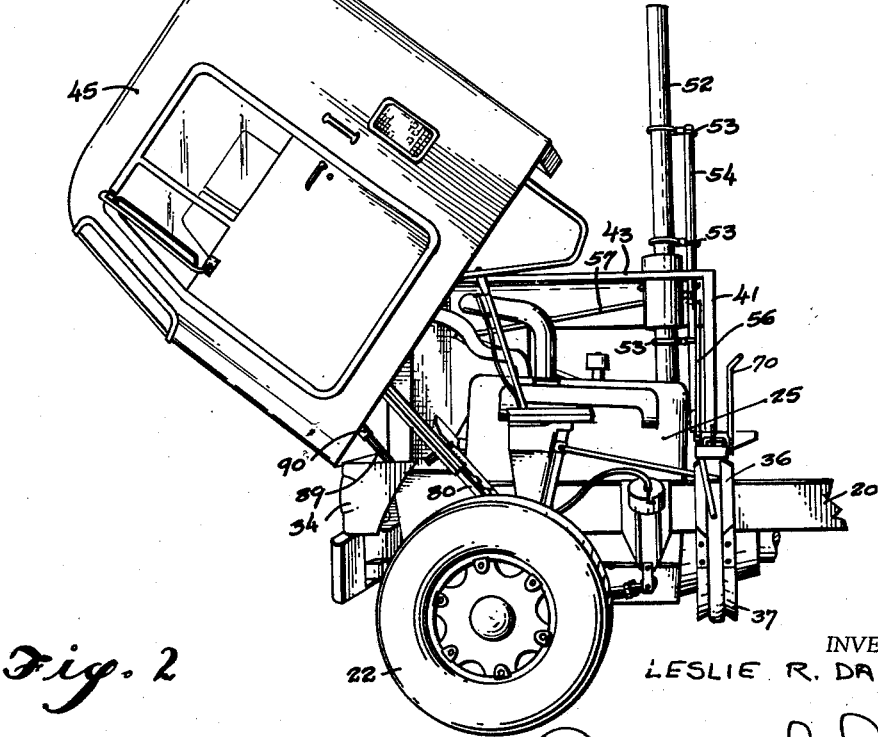
FIG. 2 is a fragmentary side elevational view thereof with the half-cab shown as having been tilted forwardly.
Figure 3:
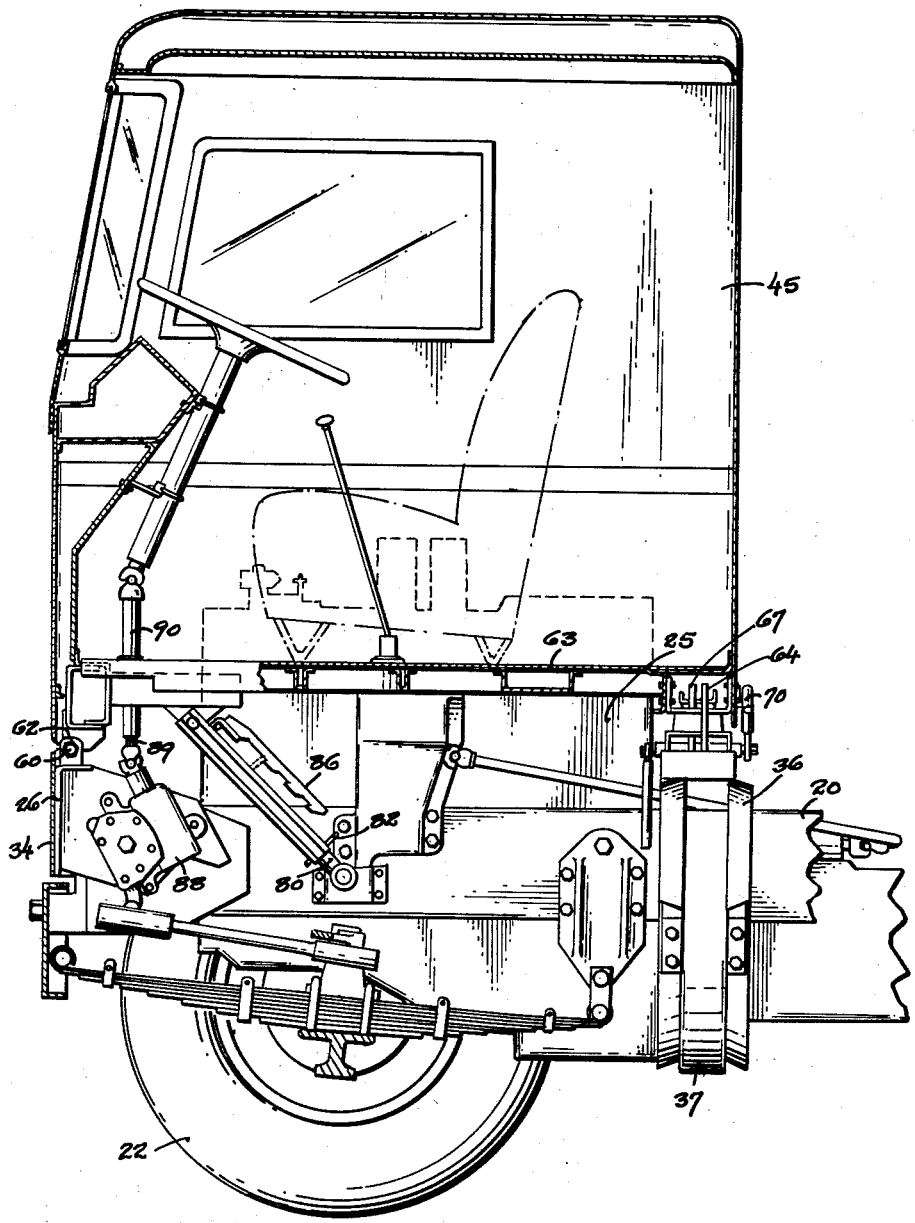
FIG. 3 is a fragmentary longitudinal vertical sectional view drawn to an enlarged scale on substantially the median line of the cab, and showing the driver's seat only in phantom and deleting all controls other than the shift lever and the steering wheel so as to simplify the illustration.

The half-cab is tilted forwardly by a hydraulic ram, moving from the normal lowered position shown in FIG. 3, whereat the rear edge rests upon two rubber pillows 65, into the raised position illustrated in FIG. 2. In such lowered position the cab is engaged by two latching levers. One lever 64 is yieldingly urged into its latching position by a spring 66. The other lever 67 is mounted upon an eccentric 68 manually turned by a handle 70 so as to be forcefully brought downwardly into hooking engagement over a catch 71. A spring 72 yieldingly urges the hooking end 73 of the lever 67 toward the catch. The latching lever 67 is the subject matter of pending patent application Ser. No. 720,627, filed Mar. 11, 1958, and now Patent No. 2,943,693, and no effort is here made to detail its structure which includes a pin-and-finger arrangement (not shown) by which a rotation of the eccentric, responsive to the movement of the handle 70 from the horizontal locking position in which it is shown in FIG. 7 into substantially an upright position, backs off the hooking end 73 so as to clear a longitudinal slot 74 of the cab. It will be apparent that both latching levers must be moved into an inoperative position in order to free the cab for tilting motion.

Ram structure substantially the same as I have here illustrated for controlling the tilting motion of the half-cab is the subject matter of Pat. No. 2,947,376. Suffice it to here say that the same is a piston-cylinder assembly with the cylinder 80 attached to the vehicle main frame and the piston 81 attached to the cab. A catch 82 is made to move along the length of the cylinder in unison with the piston and is brought into engagement with a selected one of several successively traversed notches, as 83, 84 and 85, provided by a latch 86 pivoted to swing between operative and inoperative positions about a transverse horizontal axis fixed in relation to the cylinder. A toggle-mounted set lever 87 yieldingly holds the latch in either a lowered operating position or an elevated inoperative position.

It should perhaps be here noted that the steering arrangement which is employed with the present vehicle is also the same as that employed in the vehicle of said Patent No. 2,947,376. An important characteristic is that a spline-connected shaft-and-tube pass steering motions originating in the cab into a gear case 88 carried by the main frame. The splined shaft 89 may be freely withdrawn from the tube 90. When performed in conjunction with a removal of either the pivot pin which attaches the hydraulic cylinder to the vehicle main frame or the pivot pin which attaches the associated ram to the cab, this permits the half-cab to be tilted "full-over," if desired, resting the free end upon a suitable prop.

A rear view mirror 91 for the starboard side of the vehicle is carried by a stand 92 which foots upon said fore-deck 33 provided to the right of the engine compartment.

It is believed that the invention will have been clearly understood from the foregoing detailed description of my illustrated now preferred embodiment. Minor changes in the details of construction will suggest themselves and I accordingly intend that no limitations be implied and that the hereto annexed claims be given a scope fully commensurate with the broadest interpretation which the employed language fairly permits.

What I claim is:

1. In a tilting-cab vehicle, in combination: a vehicle main frame, a vehicle engine supported by the frame to occupy a position central to the width of the vehicle at the front end thereof, a fixed enclosure for said engine having both of its sides open, a half-cab pivotally supported from the vehicle frame at one side of the enclosure for forward tilting movement from a normal lowered position in which the cab closes the adjacent side opening of said enclosure into a raised position exposing said opening, a removable door normally closing the other side opening of the enclosure, a fixed exhaust stack for the engine located at the aft end of the engine with its upper end extending vertically through an opening therefor provided in the enclosure, said vertical portion of the stack being supported from an adjacent mast footing on the vehicle frame and fixedly secured by braces one of which extends laterally to a root attachment fixed to the vehicle frame and another of which extends forwardly to a root attachment fixed to the upper end of a radiator located to the front of the engine and itself braced from the vehicle frame.

2. Structure according to claim 1 in which the braces for the radiator extend diagonally rearwardly from the radiator at each side of the engine, all of said braces being located within the confines of the engine enclosure.

3. In a cab-beside-engine vehicle, in combination: a vehicle main frame, a vehicle engine supported by the frame to occupy a position central to the width of the vehicle, a fixed enclosure for said engine having openings of substantial size in both sides giving access to the engine, a half-cab occupying a position at one side of said enclosure and supported from the vehicle frame for vertical movement from a normal lowered position closing one of the side openings of the enclosure into a raised position exposing said opening, a door normally closing the other side opening of the enclosure and hinged by its upper edge to the enclosure for outward swinging movement into a position exposing said other side opening, a deck normally occupying a horizontal position immediately to the outside of said door on a level approximately coinciding with the bottom edge of the opening and hinged by one of its ends so as to be swung upwardly into an upright position, said deck providing means upon its underside arranged to be engaged by the open door when said deck is in its upright position for releasably holding the door in an open condition.

4. In a cab-beside-engine vehicle, a vehicle main frame, a vehicle engine supported by the frame to occupy a position central to the width of the vehicle at the front end thereof, a radiator fixedly supported by the frame at the front end of the engine, a fixed hood for the engine also supported by the frame having walls which extend across the top and along the back of the engine together with a portion at the front which shrouds the radiator as an ornamental shell therefor, the two sides of said hood being open and the transverse span of said top wall being such that a portion of the engine projects laterally through and beyond one of the side openings, a removable door normally closing the other side opening of the hood, and a half-cab located at the side of said hood from which the engine projects formed with a pocket at its inner side to house said projecting part of the engine and pivotally supported from the vehicle frame for forward tilting movement from a normal lowered position in which the cab fits against the hood and together with the latter and said door completely encloses the engine into a raised position exposing said projecting portion of the engine and the side opening of the hood through which the same projects, said cab being pivoted from its front end, the vehicle frame providing transversely spaced longitudinal principals and having a U-shaped member occupying a transverse vertical plane at the approximate rear end of the cab and extending as a yoke between said two frame principals, the frame also providing a cross-bar giving support to the after end of the cab and said rear wall of the hood, the two ends of the cross-bar extending laterally beyond the two frame principals, gussets secured to the vertical arms of said yoke being provided to give support to said laterally projecting ends of the cross-bar.

References Cited in the file of this patent

UNITED STATES PATENTS

| | | |
|---|---|---|
| 1,872,184 | Ragsdale | Aug. 16, 1932 |
| 2,148,308 | Spear | Feb. 21, 1939 |
| 2,502,622 | Harris | Apr. 4, 1950 |
| 2,781,102 | Prichard | Feb. 12, 1957 |
| 2,845,133 | Norrie et al. | July 29, 1958 |